Oct. 24, 1944.  O. C. SEVERSON  2,361,324
ADAPTER
Filed April 12, 1941
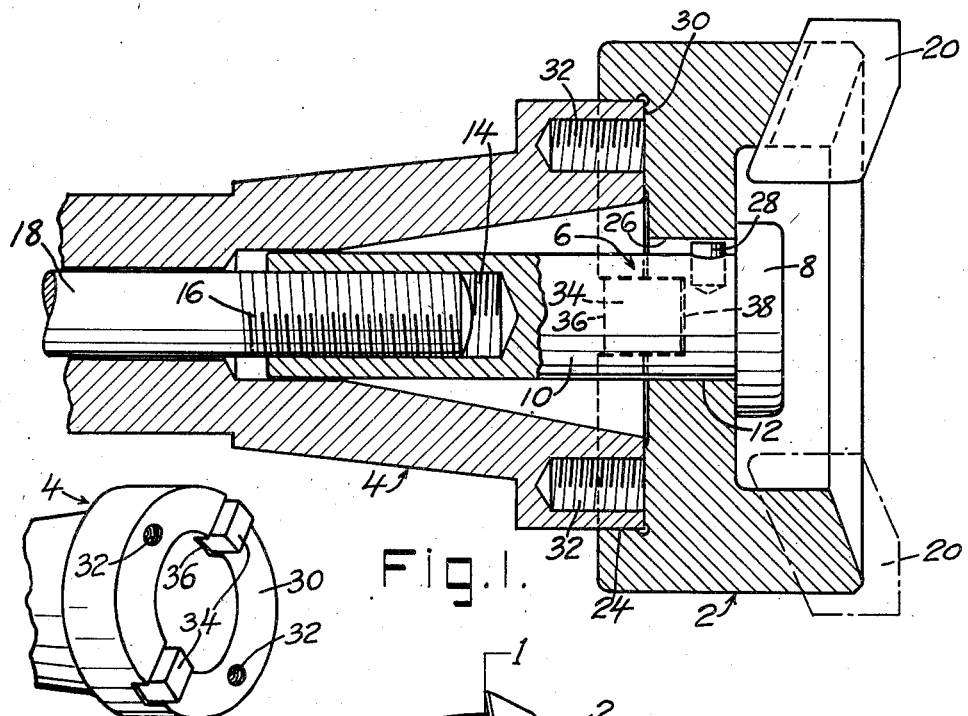
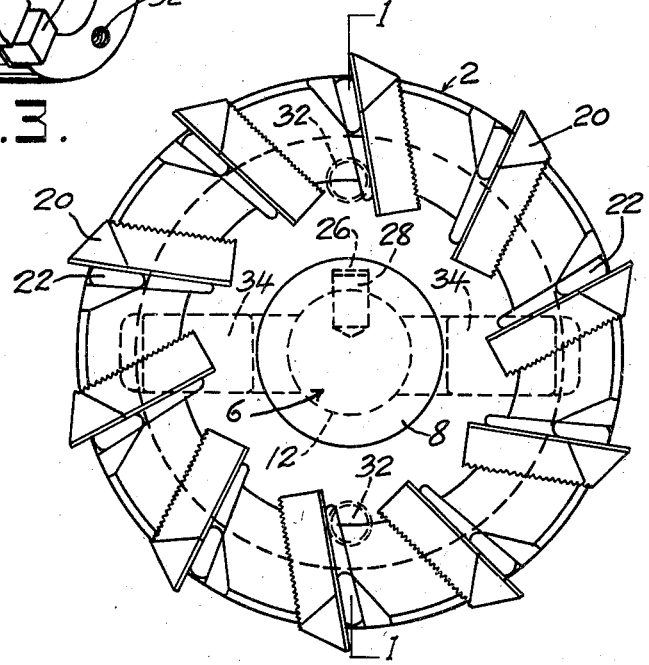
INVENTOR.
OLE C. SEVERSON.
BY Albert Sperry
ATTORNEY.

Patented Oct. 24, 1944

2,361,324

UNITED STATES PATENT OFFICE 2,361,324

ADAPTER

Ole C. Severson, Shelton, Conn.

Application April 12, 1941, Serial No. 388,193

1 Claim. (Cl. 90—11)

This invention relates to machine tools and particularly to devices for securing a rotary cutter to the spindle of a milling machine or other machine tool.

Heretofore rotary cutters for milling machines and similar tools have been secured to the tool spindle by means of bolts which pass through the body of the tool and are threaded into the spindle. This construction is satisfactory when the diameter of the cutter is sufficiently large so that the heads of the attaching bolts may lie within the inner extremities of the cutter blades. However when the cutter is of relatively small diameter, say about eight inches or less, the attaching bolts interfere with the placement of the cutter blades and it is necessary in some instances to cut the blade to make room for the bolts.

In accordance with the present invention this objection to constructions of the prior art is overcome and means are provided for attaching rotary cutters of relatively small diameter to a conventional rotary spindle. Neither the spindle nor the driving connection between the spindle and cutter need be varied from that customarily used on milling machines whereas the cutter is held against longitudinally displacement by a special adapter engageable with the usual drawbolt to clamp the cutter in place on the spindle. The adapter is located centrally of the cutter and is spaced from the cutter blades so that the blades may be adjusted in position as desired and need not be shortened to permit attachment of the cutter to the spindle.

One of the principal objects of the present invention is to provide a novel type of adapter for securing cutters to rotary spindles.

Another object of the invention is to provide a cutter and novel attaching means therefor which is spaced from the blades of the cutter and adapted to secure the cutter to a conventional spindle for preventing longitudinal displacement of the cutter with respect to the spindle.

A further object of the invention is to provide means extending through a cutter adjacent the center thereof and engageable with the drawbolt of a spindle for securing the cutter to the spindle of a machine tool.

These and other objects and features of my invention will appear from the following description thereof in which reference is made to the figures of the accompanying drawing.

In the drawing:

Fig. 1 is a vertical sectional view taken on the line 1—1 of Fig. 2 showing a conventional spindle having a cutter and adapter embodying the present invention applied thereto;

Fig. 2 is an end view of the cutter and adapter shown in Fig. 1; and,

Fig. 3 is a perspective of the spindle showing the driving keys in place therein.

In that form of my invention chosen for purposes of illustration and shown in the figures of the drawing, a rotary cutter 2, which may be of relatively small diameter, is secured to a conventional spindle 4 of a milling machine or the like. The cutter is held against longitudinal displacement with reference to the spindle by means of an adapter 6 which is formed with a head 8 that bears against the outer face of the cutter. The shank 10 of the adapter passes through a centrally located opening 12 in the cutter and is formed on its inner end with an internally threaded recess 14 which receives the threaded end 16 of the drawbolt 18 of the spindle 4.

The form of cutter illustrated is typical of those which may be used on a milling machine in the practice of my invention. This cutter is provided with cutting blades 20 which are radially adjustable with respect to the cutter and held in place by members 22. However it will be understood that any suitable or conventional type of the cutter and blades may be used and the form and size of the cutter may be varied to utilize the invention in securing other cutters to a spindle.

The central portion of the cutter illustrated is provided with the opening 12 located axially of the cutter and formed with a radially extending keyway 26. A pin or other projection 28 on the shank 10 of the adapter extends into the keyway 26 in the central portion of the cutter body and serves to prevent relative rotation of the adapter and cutter upon rotation of the drawbolt to draw the head of the adapter inward into clamping engagement with the outer face of the cutter. The rear face 30 of the central portion of the cutter engages the outer face of the spindle and extends over the usual bolt holes 32 which are formed in the spindle for receiving the attached bolts by which cutters of large diameters are secured to the spindle. The marginal portion of the rear face of the cutter is formed with a rearwardly extending annular shoulder 24 which serves to center the cutter with respect to the spindle.

Any suitable or conventional type of driving connection may be provided between the cutter and the spindle. As illustrated the usual keys 34 are positioned to extend into recesses 36 in the outer face of the spindle and into recesses 38 in the rear face of the cutter. The driving connection between the spindle and cutter therefore places no strain upon the radially extending pin 28 or on the walls of the keyway 26 in the central opening through the spindle body.

In attaching a cutter to a spindle by means of the adapter illustrated, the driving keys 34 are inserted into the recesses 36 in the spindle. The shank 10 of the adapter is then passed through the central opening 12 in the body of the spindle and is positioned so that the pin 28 will enter into the keyway 26. The cutter is positioned so that the driving keys 34 enter recesses 38 in the rear face of the cutter and the shank of the adapter is inserted into the spindle to engage the threaded end 16 of the drawbolt 18. The drawbolt is then rotated to draw the head of the adapter inward toward the outer face of the cutter to clamp the cutter in place against the outer face of the spindle and prevent longitudinal movement of the cutter with respect to the spindle. The pin 28 on the shank of the adapter preferably fits rather loosely within the keyway 26 in the cutter so that none of the driving strain is applied to the adapter or pin, whereas, the adapter is prevented from rotating with the drawbolt as the head of the adapter is drawn into clamping engagement with the cutter. When it is desired to remove the cutter it is only necessary to rotate the drawbolt while holding the cutter against rotation. The pin and keyway then serve to prevent rotation of the adapter and permit removal of the adapter and cutter from the spindle.

While I have shown and described a preferred type of adapter embodying my invention it will be apparent that the form and construction of the adapter may be changed considerably within the scope of my invention, particularly when the adapter is employed for securing other types of cutters to the spindle of a machine tool. In view thereof it should be understood that the preferred form of my invention shown in the drawing and herein described is intended to be illustrative of my invention and is not intended to exclude the use of equivalent and alternative structures falling within the scope of the following claim.

I claim:

A cutter for attachment to a conventional spindle having a draw bolt extending axially therethrough and a head with bolt holes therein adpated to receive bolts for securing a cutter to the spindle, said cutter having one face formed to engage said head and having cutter blades secured adjacent the opposite face of the head and projecting inwardly from the periphery of the cutter into positions in which they preclude attachment of the cutter to said spindle by means of said bolts, an adaptor having a portion formed to bear against said opposite face of the cutter and provided with a shank passing through the center of the cutter and engaging said draw bolt to clamp the cutter onto the spindle, said adaptor and cutter having means thereon for preventing relative rotation of the cutter and adaptor, and means engaging the spindle and cutter to prevent relative rotation of the spindle and cutter.

OLE C. SEVERSON.